US007296272B2

(12) United States Patent
Kyriakides et al.

(10) Patent No.: US 7,296,272 B2
(45) Date of Patent: Nov. 13, 2007

(54) SYSTEM IN WHICH A FIRST PROGRAM WRITTEN IN ONE PROGRAMMING LANGUAGE CAN INTERACT AND ACCESS A SECOND PROGRAM WRITTEN IN A DIFFERENT PROGRAMMING LANGUAGE

(75) Inventors: Lionel Kyriakides, Brignoud (FR); Sebastien Bouat, Crolles (FR)

(73) Assignee: Hewlett-Packard Development, L.P., Houston, TX (US)

( * ) Notice: Subject to any disclaimer, the term of this patent is extended or adjusted under 35 U.S.C. 154(b) by 704 days.

(21) Appl. No.: 10/444,096

(22) Filed: May 23, 2003

(65) Prior Publication Data

US 2004/0040032 A1    Feb. 26, 2004

(30) Foreign Application Priority Data

May 23, 2002  (EP)  ................................ 023540859

(51) Int. Cl.
*G06F 3/00*    (2006.01)
*G06F 9/44*    (2006.01)
*G06F 9/46*    (2006.01)
*G06F 13/00*   (2006.01)

(52) U.S. Cl. ...................................... 719/314; 719/313
(58) Field of Classification Search ........ 719/310–320, 719/328–330; 709/200–225; 717/100–118
See application file for complete search history.

(56) References Cited

U.S. PATENT DOCUMENTS

| 6,738,975 | B1* | 5/2004 | Yee et al. ................... 719/310 |
| 6,854,122 | B1* | 2/2005 | Sheriff et al. ............... 719/316 |
| 6,865,733 | B2* | 3/2005 | Broussard ................... 717/147 |
| 6,918,125 | B1* | 7/2005 | Skinner et al. ............. 719/329 |
| 2005/0229189 | A1* | 10/2005 | McManus ................... 719/330 |

* cited by examiner

*Primary Examiner*—William Thomson
*Assistant Examiner*—Diem K Cao (57) ABSTRACT

A system accesses, from a first computer program written in a first computer language, functionality available through a second computer program written in a second computer language. The system has an interface intermediate the first and second programs for enabling access between the first program and the second program. The interface includes (a) a first handler in the second computer language for receiving messages from the functionality and (b) a second handler for retrieving messages, via the interface, that the first handler receives. The second handler is part of the first program.

20 Claims, 6 Drawing Sheets

SYSTEM IN WHICH A FIRST PROGRAM WRITTEN IN ONE PROGRAMMING LANGUAGE CAN INTERACT AND ACCESS A SECOND PROGRAM WRITTEN IN A DIFFERENT PROGRAMMING LANGUAGE

FIELD OF INVENTION

The present invention relates generally to the field of computer programs, and more particularly to improvements in the architecture of a system in which a first computer program written in one programming language can interact with and access a second computer program written in a different programming language.

BACKGROUND ART

Java is a popular and widely used high-level programming language. A computer program written in Java source code is compiled into Java byte code, hereinafter referred to as a Java application, and is interpreted upon execution by a so-called Java virtual machine (JVM). The JVM transforms the byte code into executable instructions specific to the platform on which the Java application and the Java virtual machine are run. In this way, providing that only functionality within the JVM is used by the Java application, Java developers can write Java applications that are largely portable and executable on any platform having an appropriate JVM. Such an arrangement thereby removes the need for Java developers to have specific knowledge about individual execution platforms and is one of the reasons why the Java programming language has become so popular over recent years.

In many circumstances Java applications are less efficient than applications written in generally non-portable languages such as C, C++ and assembly language. The lower efficiency is mainly due to the fact that, for portability reasons, much low-level platform specific functionality which is easily accessible from C and C++ is not available directly through Java. However, where Java applications are required because they have platform independence, efficiency is not usually of primary concern and the advantages brought by portability generally outweigh any disadvantages regarding performance.

In the field of telecommunications there is an increasing desire to write telecommunication applications in Java, due in part to its relative ease of use. However, one of the problems posed with writing applications in Java, particularly in the telecommunications field, is that the much of underlying telecommunications systems are controlled by legacy applications written in languages other than Java. This is largely for historical reasons and partly because Java is not generally a good choice of language especially where high performance low-level functionality is required. Accordingly, a Java application written for a telecommunications system is generally required to access existing legacy applications or programs written in other languages, especially where access to low-level functionality, such as interacting with a communicating module, such as a communication stack, is required.

In order for a Java application to access an application or program written in a language other than Java (hereinafter referred to as a 'native application') the Java native interface (JNI) can be used. The Java Native Interface (JNI) is a documented and supported specification that allows native applications, for example written in C, C++ or assembly language, to be called from a Java application. The JNI can also enable native applications, under certain circumstances, to call a Java application. The JNI may be considered as an additional library that can map Java methods to corresponding native functions.

Not surprisingly, use of the JNI generally introduces some performance overhead, especially where data is transferred between a Java application and a native application. Where such data transfers are required it may be necessary to perform a translation from, for example, a Java data object to a C structure, or vice-versa. In many situations, for example where a Java application is required to access or schedule an asynchronous communication stack, the Java application may be required to make considerable use of the JNI and hence may incur considerable performance overhead. Such situations are common, for example in telecommunications systems One aim of the present invention is to mitigate at least some of the aforementioned problems.

SUMMARY OF THE INVENTION

According to a first aspect of the present invention there is provided a system for accessing, from a first computer program written in a first computer language, functionality available through a second computer program written in a second computer language. The system comprises an interface intermediate the first and second programs for enabling access between the first program and the second program. The system further comprises a first handler in the second computer language for receiving messages from the functionality. A second handler, that is part of the first program, retrieves messages, via the interface, received by the first handler.

Advantageously, overall performance is improved by reducing the required usage of the intermediate interface, e.g. the JNI, when accessing or scheduling an asynchronous event/message module, such as a communication stack. Furthermore, if it is necessary to later migrate to a message-based communication framework, such a change can be made with relative ease.

The functionality available through the second computer program enables messages to be received from a communicating module which, in a preferred embodiment is a communications stack.

The first handler may be implemented as a thread of the second program.

Preferably the first handler is interposed between the functionality and the interface in a separate thread in the second language and the second handler is interposed between the first program and the interface.

The first handler may access the communication stack by calling the provided functionality.

In a preferred embodiment the first handler filters the received messages to remove messages not relevant to the first program.

The first handler may also comprise a message queue for receiving messages from the functionality.

The second handler may be incorporated into the first computer program, preferably as a thread in the first language.

In a preferred embodiment the first computer language is Java and thus the system preferably further comprises a Java virtual machine.

The second computer language is preferably any one of C, C++, or assembly language.

Where the first computer language is Java it is preferred that the interface is the Java Native Interface (JNI).

Typically the functionality is provided in the form of an Application programming interface (API).

According to a further aspect, there is provided a method of accessing, from a first computer application written in a first computer language, functionality available through a second computer application written in a second computer language. The method is performed with a system comprising an interface intermediate the two applications for allowing access between the first and second applications. The method comprises receiving messages from the functionality using a handler provided as part of the second computer language. Messages not relevant to the first application are removed from the received messages, preferably by filtering. The filtered messages are retrieved, via the interface, by the first application.

According to a still further aspect, there is provided a computer system comprising a plurality of computer programs written in different computer languages wherein a first computer program, written in a first computer language, accesses functionality accessible via a second computer program written in a second computer language. An interface intermediate the computer programs written in the different languages is required to allow such access. The interface includes (1) a first handler intermediate the interface and the functionality for receiving messages from the functionality and for removing messages not relevant to the first program; and (2) a second handler for retrieving messages from the first handler for use by the first computer program.

According to yet a further aspect, there is provided a component for a computer system. The computer system has a plurality of computer programs written in different computer languages. A first computer program, written in a first computer program, receives messages from functionality accessible via a second computer program written in a second computer language. The messages are received via an interface intermediate the two programs enabling such access. The component comprises a program for removing messages not relevant to the first computer program from the received messages.

BRIEF DESCRIPTION OF THE DRAWINGS

An embodiment of the invention will now be described, by way of example only, with reference to the accompanying drawings, in which.

DETAILED DESCRIPTION OF THE DRAWINGS

Figure 1:
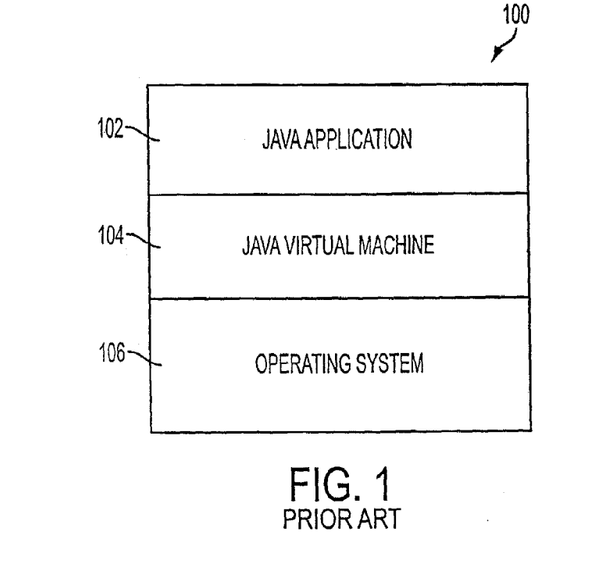
FIG. 1 is a block diagram of the general architecture of a typical Java application, according to the prior art.

FIG. 1 is a block diagram of the general architecture of a typical Java application according to the prior art.

When a Java application 102 is executed, the Java byte code which describes the application is interpreted by the Java virtual machine 104 and is transformed into executable instructions specific to the operating system 106. In this way, the Java application may function as intended on the particular platform running the operating system 106. If the Java application only uses functionality supported by the JVM 104, the Java application may also be executed on different platforms having the same or different operating systems as is widely known.

Figure 2:
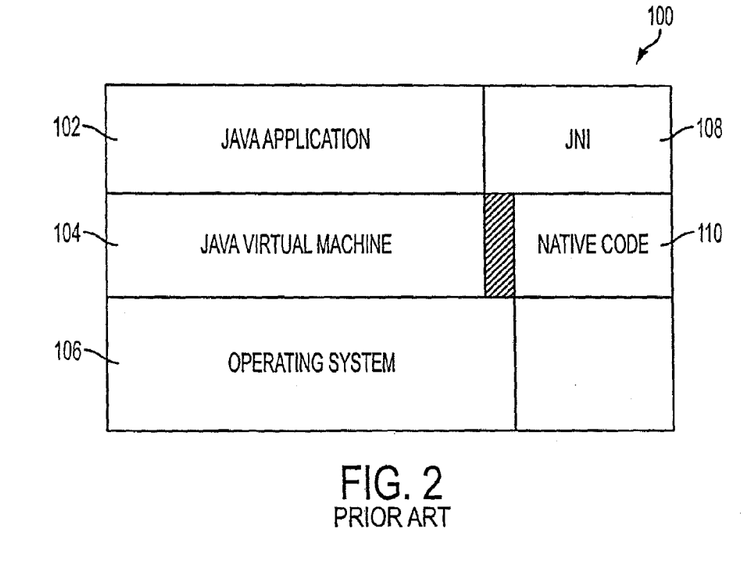
FIG. 2 is a block diagram of the general architecture of a Java application using the JNI, according to the prior art.

In order for a Java application to use functionality outside of that provided by the JVM, for example that provided by an application written in a language such as C, C++ or assembly language, the Java native interface (JNI) may be used, as shown in FIG. 2. This may be particularly desirable when low-level functionality is required, for example, to be written in a lower-level language for performance reasons, or to take advantage of already existing legacy applications written in native languages. FIG. 2 is a block diagram of the general architecture of a Java application using the JNI according to the prior art. For functionality provided by the JVM 104 the Java application 102 functions in the manner described above. Where functionality outside of that provided by the JVM is required, the JNI 108 can be used as follows. The Java application calls a Java method, mapped to a corresponding native function, through use of the JNI 108 and the mapping layer 109. The JNI and the mapping layer translate payloads from the Java domain to the native domain, and vice versa. The mapping layer can be thought of as comprising additional program code that performs, amongst other tasks, payload translation. The JNI and the mapping layer translate any payloads from the Java domain to the native domain (and vice versa) and call the corresponding native code function.

Not surprisingly, use of the JNI inevitably introduces some performance overhead due to the additional function calls and mapping functions that may be required. The processes involved in using the JNI are well known by those skilled in the art and are not described in detail herein.

Figure 3:
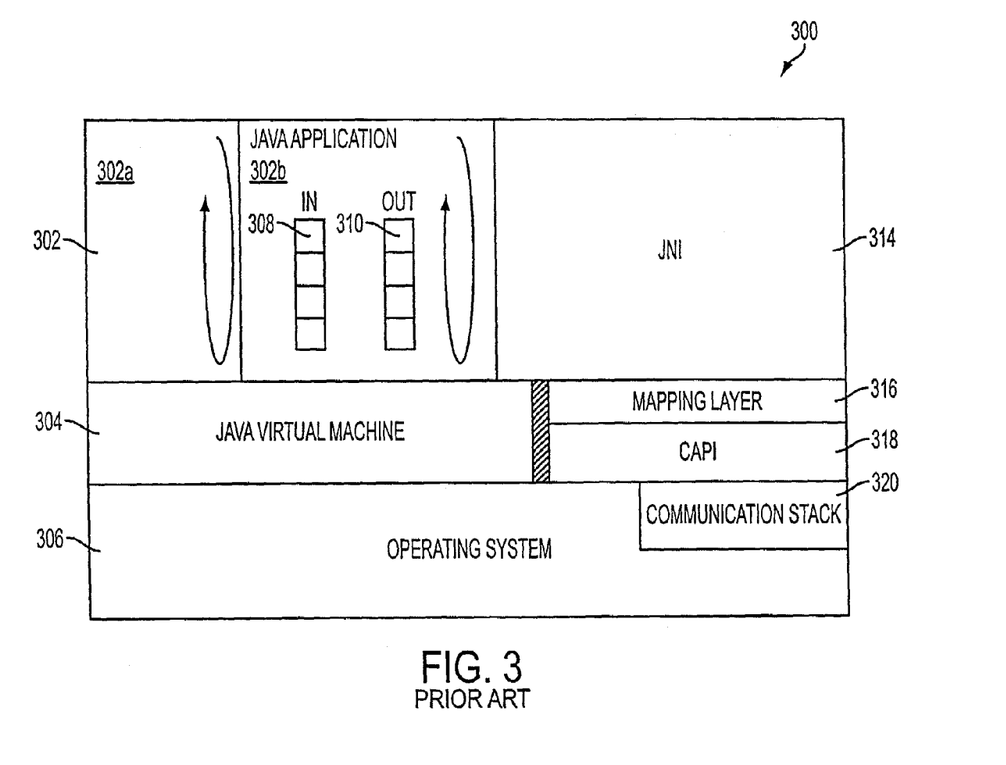
FIG. 3 is a block diagram of a Java application capable of accessing a communication stack via the JNI, according to the prior art.

FIG. 3 is a block diagram showing a Java application capable of accessing a communicating module, such as a communication stack, via the JNI according to the prior art. A Java application 302 has an internal in-bound message queue 308 and an internal out-bound message queue 310. The message queues are used by the Java application 302 for respectively receiving messages from and sending messages to a communication stack 320. The communication stack 320 has an application programming interface (API) 318 written in a native language, such as C. The API provides a message based interface for interacting with the communication stack, with predefined primitives providing functionality, such as for sending messages to and for receiving messages from the stack.

In order for the Java application to access the communication stack 320 via the API 318 the Java application uses the JNI 314. The Java application 302 has a main Java application thread 302a, for controlling the main flow of the Java application, and a secondary thread 302b for controlling the message queues 308 and 310. The Java application accesses the functionality of the JVM 304 and hence the operating system 306 as described previously. The thread 302b is responsible for (1) sending any messages placed in the out-bound queue 310, for example by the main Java application thread 302a, to the communication stack 320, (2) retrieving messages from the communication stack 320 and (3) placing the retrieved messages in the inbound queue 308 for use, for example, by the main Java application thread 302*a*.

Figure 4:
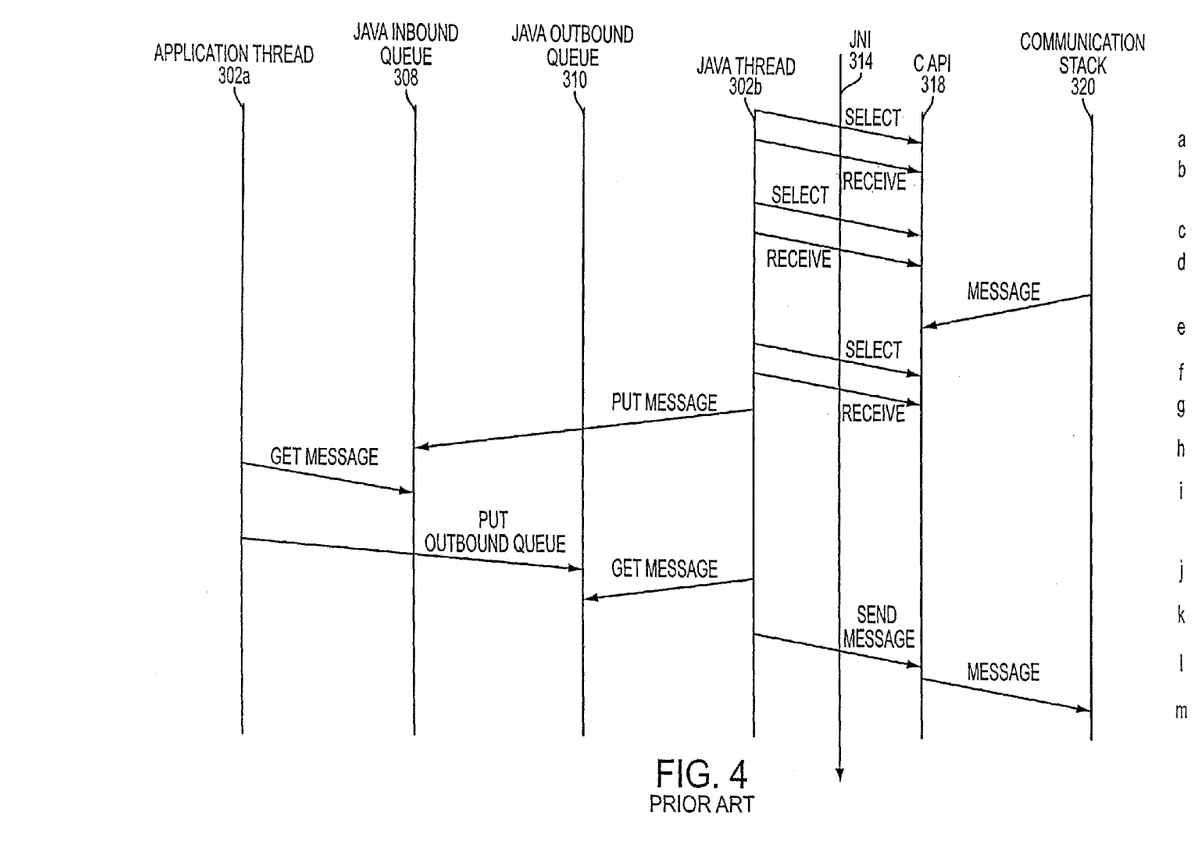
FIG. 4 is a sequence diagram outlining the general operation of the system of FIG. 3.

The way the thread 302*b* accesses the communication stack 320 is described below with reference to FIG. 4 which is a sequence diagram outlining the operation of the system 300 of FIG. 3. Each event is designated by a letter a to i, shown at the right-hand side of the Figure. FIG. 4 shows, as vertical lines, representations of the different elements of the system 300, namely the main Java application thread 302*a*, the Java in-bound queue 308, the Java out-bound queue 310, the Java thread 302*b* for controlling the queues, the JNI 314, the C API 318 and the communication stack 320.

The operations involved in retrieving a message from the communication stack 320 are now described. In the following description, functions and methods are referred to in the format 'Type MethodName', where Type is indicative of the language domain of the function/method and where MethodName is indicative of the generic functionality provided by the function/method. In keeping with the spirit of established naming conventions, Java methods are herein separated by a '.' and C functions by a '_'. For example, reference to 'Java.Select' refers to a Java method that performs a general 'Select'-type method. Similarly, 'C_Receive' refers to a C function that performs a general 'Receive'-type function. Such references do not necessarily refer to existing or available Java or C functions/methods or libraries, and are used herein merely to indicate the general intended purpose of such a function/method as will be clearly understood by those skilled in the field.

The Java thread 302*b* calls a 'Java.Select' method, line a, which is used to determine the presence of a message on the communication stack 320. The 'Java.Select' method is mapped to a 'JNI.Select' method in the mapping layer 316. As will be understood by those skilled in the art, each function mapping can also perform any required payload mapping or translation. The 'JNI.Select' method calls a C API function 'C_Select' as indicated by the mapping layer 316. The mapping from one method to another can also provide additional functionality, other than just pure mapping; for example registers or flags may need setting and other functions may need calling.

The 'C_Select' function results in a blocking operation. While the blocking operation occurs, the 'C_Select' function waits for a new message to arrive from the communication stack 320, which has the effect of blocking the Java thread 302*b*. When a new message or event arrives (line b) the Java thread 302*b* is unblocked and calls a 'Java.Receive' method (line c) which, in the manner described above, is mapped through the JNI to call a corresponding 'C_Receive' function provided by the C API 318. The 'Java.Receive' method retrieves the message from the communication stack 320 where the message is either placed in the in-bound queue 308 using a 'Java.PutMessage' method (line d) if the message is determined as being relevant to the Java application, or the message otherwise is discarded. This process is outlined in lines a to d of FIG. 4. If a received message is placed in the in-bound queue 308, the main application thread 302*a* may subsequently retrieve the message using a 'Java.GetMessage' method, line e.

A similar process sends messages from the main Java application thread 302*a* to the communication stack 320. To send a message to the communication stack 320 the main Java application thread 302*a* first places the message to be sent in the outgoing queue 310, using, for example, a 'Java.PutMessage' method (line f). The thread 302*b* removes the message from the queue by using a 'Java.GetMessage' method (line j). The thread 302*b* then sends the message, across the JNI (line h) to the communication stack 320 (line i).

Due to the real-time and asynchronous nature of the communication stack 320 is the Java application preferably frequently checks the communication stack for new messages. In telecommunications systems it is generally required that messages be timely processed, especially when such messages relate to call establishment, billing and so on. In telecommunications systems a multitude of messages and events may be present or may arrive at the communication stack 320, although not all of these will be relevant to the Java application 302. For example, many events may be of use for the internal use of the communication stack 320.

One of the main problems with retrieving messages in this way is that the scheduling of the communications stack is carried out by the Java application. In practice this means that every 'Java.Select' and every 'Java.Receive' method makes use of the JNI and hence incurs some performance overhead. This also means that even messages/events that are not relevant to the application traverse the JNI, even though they may be later discarded by the application.

Despite the above-mentioned problems, the above architecture is widely used since, as far as Java developers are concerned, the solution is easy to implement since no access or modifications are required to the native source code. However, as performance becomes ever more critical, an improved solution is sought.

Figure 5:
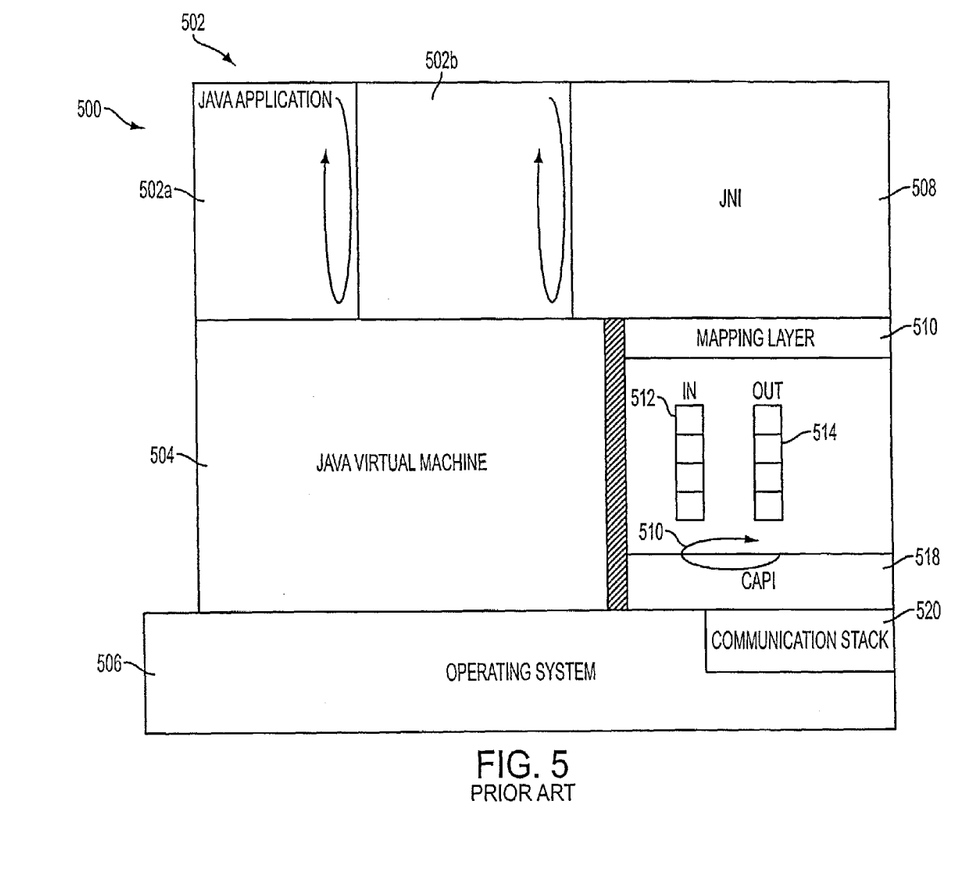
FIG. 5 is a block diagram of a Java application using the JNI according to a first embodiment of the present invention.

FIG. 5 is a block diagram of a Java application using the JNI according to a first embodiment of the present invention, in which the Java application 502 can receive messages from and send messages to a communication stack 520. The system is described with reference to the sequence diagram shown in FIG. 6.

In the system according to the first embodiment, the thread controlling the in-bound and out-bound message queues, 506 and 508 respectively, is a C thread 516 which may reside on top of the C API 518 or may be an independent program thread running in the C space. The C thread controls the message queues by receiving messages from the communication stack 520 through the C API 518. Preferably the thread 516 is written in the same language as the native application. Messages placed in the out-bound queue are transmitted to the communication stack, and messages received from the communication stack 520 are placed in the in-bound queue for subsequent retrieval by the Java application 502, via the JNI.

The Java application 502 shown in FIG. 5 comprises two threads; a main application thread 502*a* for controlling the main application function; and a secondary thread 502*b* responsible for general message handling associated with reading messages from the in-bound queue 512 and for sending messages to the out-bound queue 514. Those skilled in the art will appreciate, however, that other architectures or designs can also be used, for example using a single thread or multiple threads as appropriate.

The Java thread 502*b* performs a blocking operation, subject to any timeout period, until a message is placed in the in-bound queue 512, at which point the Java thread 502*b* wakes up and retrieves the message via the JNI. Once the message has been retrieved it may be, for example, passed to the main Java application thread 502*a* for further processing.

Figure 6:
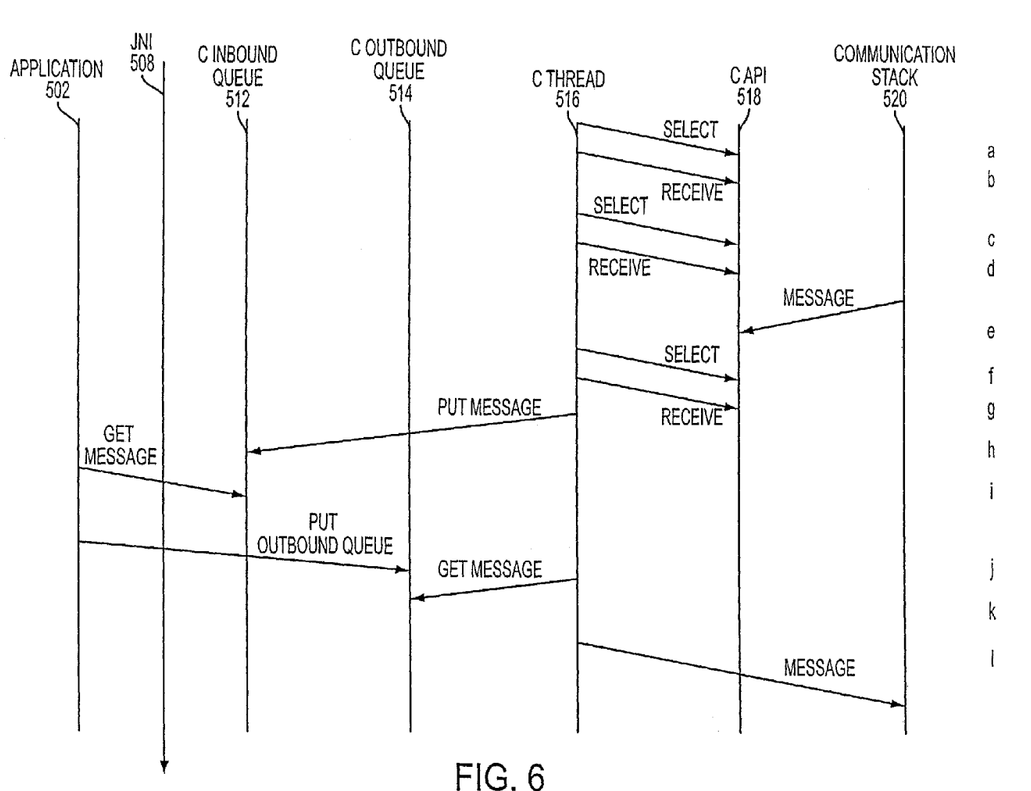
FIG. 6 is a sequence diagram of the operation of the system of FIG. 5 according to the first embodiment.

Referring now to FIG. 6, the Java application 502 calls a 'Java.Select' method (line a), which performs a blocking operation while waiting for a new message to arrive in the C in-bound message queue 512. The C thread 516, which is independent of the Java thread and performs general message handling functions, calls a 'C_Select' function (line b). The 'C_Select' function performs a blocking operation while waiting for new messages to arrive from the communication stack 514. When a message arrives on the communication stack (line c) the C thread 516 wakes up and calls a 'C_Receive' function which preferably determines whether the message is of relevance to the Java application 502 (line d). This process occurs whenever a message or an event is received on the communication stack, as illustrated in lines a to g. If application 502 determines that the message or event is not relevant, application 502 discards or ignores the messages, and the C thread 516 waits for the next message to arrive. Application 502 preferably bases its decision as to the relevance of a message on a set of predetermined conditions incorporated into the C thread.

When a message of relevance arrives on the communication stack, line i, the 'C_Select' function retrieves the message and calls the 'C_Receive' function to retrieve the message from the communication stack 520 (lines h to j). The C thread 516, upon receipt of a relevant message, places the message in the in-bound queue 512 through use of a 'C_PutMessage' function (line k). The Java thread 502b unblocks when a message arrives in the C in-bound queue, thereby enabling the thread 502b to retrieve the message, via the JNI.

In this example the JNI is only used twice to retrieve a relevant message from the communications stack 520; the JNI is used once to call the 'Java.Select' method, and once to retrieve a relevant message from the C in-bound queue 514. The architecture of FIG. 5 typically provides considerable performance improvements over the architecture described above with reference to FIG. 3, where the JNI is used for each and every message (whether relevant or not).

An advantage of the system of FIG. 5 over the prior art system described above arises largely from the fact that control of the in-bound and out-bound queues is moved, relative to the prior art, from the Java application to the other side of the JNI boundary and into the same code space through which the communication stack is accessed. By doing so, the number of method/function calls that are required to traverse the JNI may be significantly reduced. Since the only messages that are sent across the JNI are those that are relevant to the Java application, the system of FIG. 5 helps to prevent messages that are not relevant from using up valuable processor resources incurred as a result of traversing the JNI. In telecommunications systems even small performance improvements can provide significant benefits.

In all of the above-described examples it is should be noted that the Java application, C API and communication stack are preferably all running on the same hardware platform, as is currently common in the telecommunications field.

Figure 7:
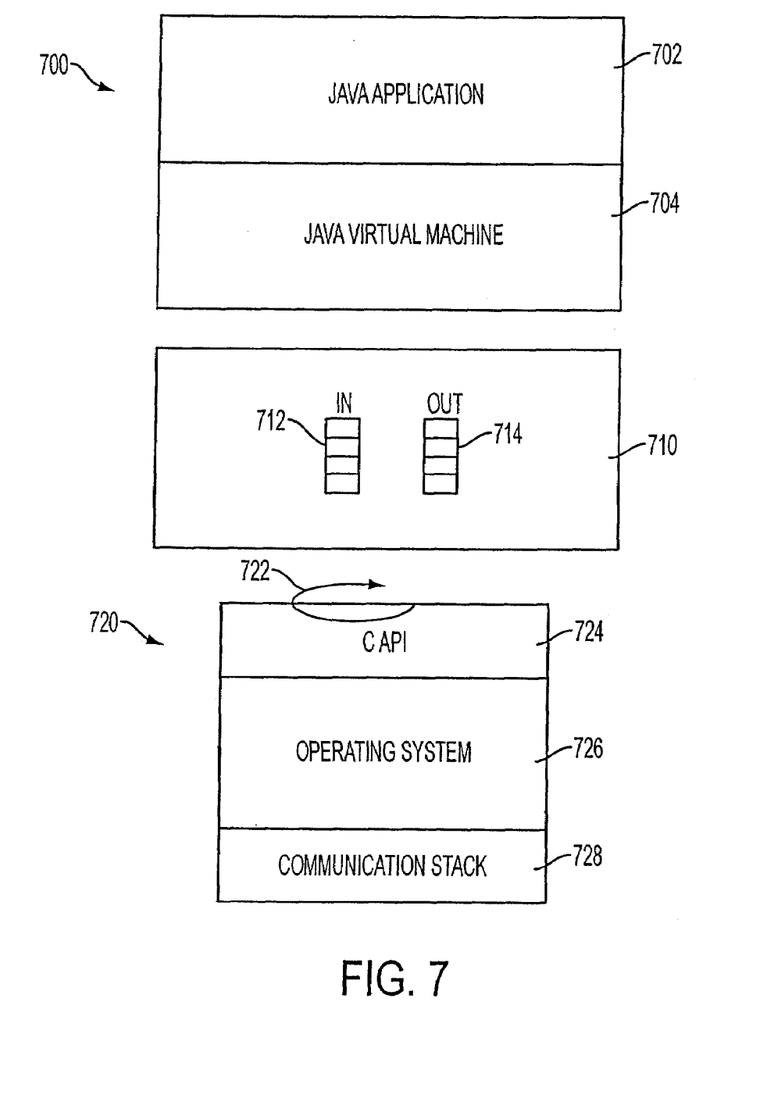
FIG. 7 is a block diagram of an example of a Java application capable of accessing a communications stack using a message-based communication framework.

In some instances, the operations preferably operate on a more distributed model, for example taking advantage of new message-based technologies, such as that outlined in FIG. 7. The system shown in FIG. 7 utilizes a communication framework server 710 running on an independent message server for communicating messages between other distributed systems, such as a Java application 702 and a telecommunications system 720. Such a message framework 700 can, for example, be based on the Java messaging server (JMS) or other suitable technology. In the model illustrated in FIG. 7 each of the main elements; the Java application 702, the communications framework server 710 and the telecommunications system 720 can all run on independent and geographically remote systems, with each of the elements in the system being at least remotely connectable as will be appreciated by those skilled in the field.

An additional, advantage of the system of FIGS. 5 and 7 lies in its future-proof design and the fact that migration to a message-based communication framework requires relatively minor changes to the system.

By contrast however, to make the transition in a single step from, for example, the prior art system described with reference to FIGS. 3 and 4 above, to a message framework based architecture requires significant large-scale changes.

As is well known in the field of software development, modifications to software systems always carry an inherent risk of introducing errors or bugs into the program code, and it is almost always preferable to limit the exposure to such risks. Providing a solution in accordance with the systems of FIGS. 5 and 7 not only provides an efficient architecture for current requirements, but also enables future migrations to such message-based systems to be undertaken with relative ease.

In this way, should an eventual migration to a message-based system be required, the systems of FIGS. 5 and 7 can be easily modified. Such an approach has the advantages of providing a future-proof current solution, in which the costs of any eventual migration can be either delayed or minimized.

The examples given above are merely illustrative to highlight the general inventive concepts of the present invention. Those skilled in the art will appreciate that the present invention is in no way limited to use with the Java or any other particular programming language. The inventive concepts outlined above can be carried out with any system requiring an intermediate interface between applications written in different languages. Use of the term communication stack is also not intended to be limiting; indeed the invention may be equally used with any kind of system that requires the scheduling of a communicating module or the like. It will be similarly appreciated that the present invention can be used in fields other than telecommunications.

The invention claimed is:

1. A computer system for accessing, from a first computer program written in a first computer language, functionality available through a second computer program written in a second computer language, the computer system comprising:

an interface intermediate the first and second programs for enabling access between the first program and the second program, a first handler in the second computer language for receiving and sending messages from functionality, wherein the functionality available through the second computer program is arranged to enable messages to be received from a communication module, the communication module is included in a communication stack, and a second handler for sending and receiving retrieving messages, via the interface, received by the first handler, the second handler being part of the first program such that only messages sent across the interface are relevant to the first program, wherein the first handler includes a message queue for receiving messages from the functionality available through the second computer program.

2. The computer system of claim 1 wherein the first handler is arranged to access the communication stack by calling the functionality provided by the second computer program.

3. The computer system of claim 1 wherein the first handler is a thread of the second program.

4. The computer system of claim 1 wherein the first handler is interposed between the functionality and the interface in a separate thread in the first language.

5. The computer system of claim 1 wherein the second handler is interposed between the first program and the interface.

6. The computer system of claim 1 wherein the first handler is arranged to remove received messages not relevant to the first program.

7. The computer system of claim 1 wherein the second handler is written in the first computer program language.

8. The computer system of claim 1 wherein the second handler is a thread in the first program language.

9. The computer system of claim 1 wherein the first computer language is Java.

10. The computer system of claim 9, wherein the system further comprises a Java virtual machine.

11. The computer system of claim 1 wherein the second computer language is any one of C, C++, or assembly language.

12. The computer system of claim 1 wherein the interface includes the Java Native Interface (JNI).

13. The computer system of claim 1 wherein the functionality is in the form of an application programming interface (API).

14. The computer system of claim 1, wherein a mapping layer is interposed between the interface and the communicating module.

15. The computer system of claim 1, wherein a main application handler controls the first program.

16. A method of accessing, from a first computer application written in a first computer language, functionality available through a second computer application written in a second computer language, the method being performed with a computer system including a processor, an interface intermediate the two applications for allowing access between the first and second application, a first handler in the second computer program language for sending and receiving messages from the functionality, and a second handler being part of the first application for sending and receiving retrieved message by the first handler, the method comprising:
   receiving messages from the functionality by using the first handler that is part of the second computer application, wherein the functionality receives messages from a communication stack, and the first handler includes a message queue for receiving messages from the functionality available through the second computer program;
   removing messages not relevant to the first computer application; and
   retrieving the relevant messages, via the interface, by the first application by using the second handler such that messages sent across the interface are relevant to the first computer application.

17. A computer system, comprising:
   a processor,
   a plurality of computer programs written in different computer languages,
   a first computer program written in a first computer language being arranged to access functionality, the first program being accessible to the functionality via a second computer program written in a second computer language, wherein the functionality is arranged to enable messages to be received from a communication module, the communication module is included in a communication stack,
   an interface intermediate the first computer program and the computer programs written in the different languages being arranged to require the access to be allowed,
   a first handler in the second computer language intermediate the interface and the functionality for receiving messages from the functionality and for removing messages not relevant to the first program and for sending relevant messages to the first program, wherein the first handler includes a message queue for receiving messages from the functionality available through the second computer program, and
   a second handler being part of the first program for retrieving messages, via the interface, from the first handler such that only messages sent across the interface are relevant to the first program.

18. The computer system of claim 17, wherein the second handler is arranged to enable the first computer program to use the retrieved messages.

19. A computer system for accessing, from a first computer application written in a first computer language, a communication module included in a communication stack accessible via functionality included as part of a second computer application written in a second computer language, the system comprising:
   a processor;
   an interface intermediate the first and second application for enabling access between the first application and the second application;
   a first handler in the second computer language for using the included functionality to receive messages from the communication stack, wherein the first handler includes a message queue for receiving messages from the functionality; and
   a second handler for retrieving messages, via the interface, received by the first handler, the second first handler being part of the first program such that only messages sent across the interface are relevant to the first computer application.

20. A computer system for accessing, from a first computer application written in a first computer language, a communication module included in a communication stack accessible via functionality included as part of a second computer application written in a second computer language, the system comprising:
   a processor;
   an interface intermediate the first and second application for enabling access between the first application and the second application;
   a first handler in the second computer language for using the functionality to receive messages from the communication module and to remove messages not relevant to the first application, wherein the first handler includes a message queue for receiving messages from the functionality; and
   a second handler for retrieving the relevant messages, via the interface, received by the first handler, the second first handler being part of the first application such that only messages sent across the interface are relevant to the first application.

* * * * *

UNITED STATES PATENT AND TRADEMARK OFFICE
CERTIFICATE OF CORRECTION

PATENT NO. : 7,296,272 B2  Page 1 of 1
APPLICATION NO. : 10/444096
DATED : November 13, 2007
INVENTOR(S) : Kyriakides et al.

It is certified that error appears in the above-identified patent and that said Letters Patent is hereby corrected as shown below:

In the Claims:

Claim 1, line 60:

please delete "retrieving"

Claim 1, line 63:

kindly insert the word -- the -- before "only messages"

Signed and Sealed this

Third Day of June, 2008

JON W. DUDAS
*Director of the United States Patent and Trademark Office*

UNITED STATES PATENT AND TRADEMARK OFFICE
CERTIFICATE OF CORRECTION

PATENT NO.         : 7,296,272 B2
APPLICATION NO. : 10/444096
DATED              : November 13, 2007
INVENTOR(S)        : Kyriakides et al.

Page 1 of 1

It is certified that error appears in the above-identified patent and that said Letters Patent is hereby corrected as shown below:

In the Claims:

Column 8, Claim 1, line 60:

please delete "retrieving"

Column 8, Claim 1, line 63:

kindly insert the word -- the -- before "only messages"

This certificate supersedes the Certificate of Correction issued June 3, 2008.

Signed and Sealed this

First Day of July, 2008

JON W. DUDAS
*Director of the United States Patent and Trademark Office*